(No Model.)

E. F. W. ELLIS.
DISH PAN.

No. 302,899. Patented Aug. 5, 1884.

Witnesses:
Robert G. McEvoy
J. A. Campbell

Inventor:
Edward F. W. Ellis

UNITED STATES PATENT OFFICE.

EDWARD F. W. ELLIS, OF ROCKFORD, ILLINOIS, ASSIGNOR TO WINFIELD S. FAITH, OF SAME PLACE.

DISH-PAN.

SPECIFICATION forming part of Letters Patent No. 302,899, dated August 5, 1884.

Application filed May 22, 1883. (No model.)

*To all whom it may concern:*

Be it known that I, EDWARD F. W. ELLIS, a citizen of the United States, residing at Rockford, in the county of Winnebago, State of Illinois, have invented a new and useful Dish-Pan; and I do hereby declare that the following is a full, clear, and exact description of the invention.

The object of my invention is to secure an easy and efficient means of washing dishes.

Figure 1:
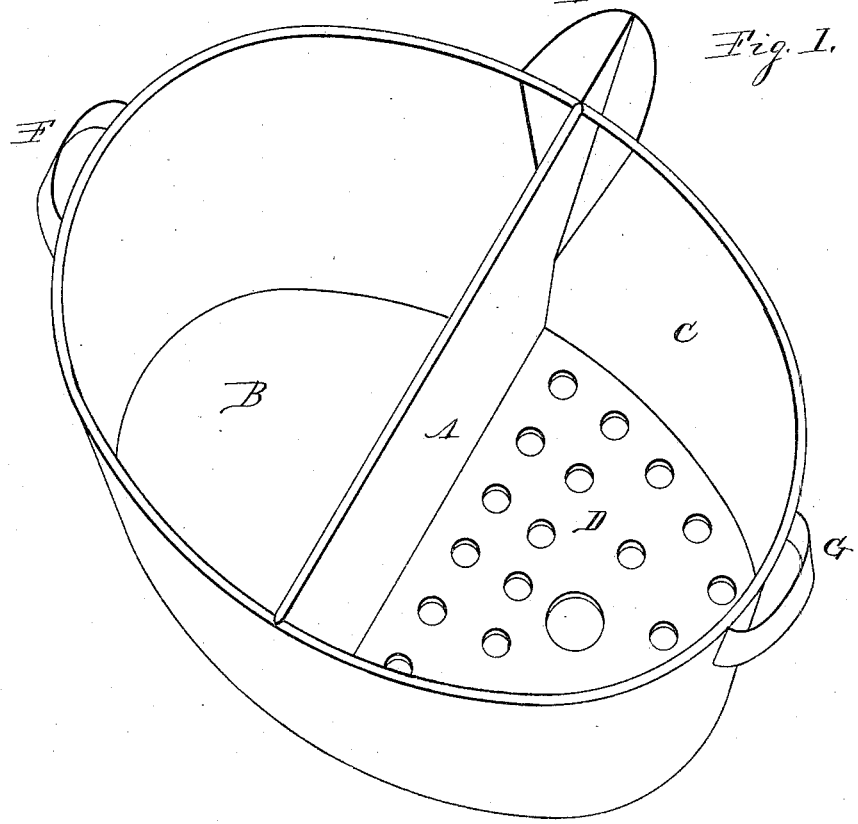
Figure 2:
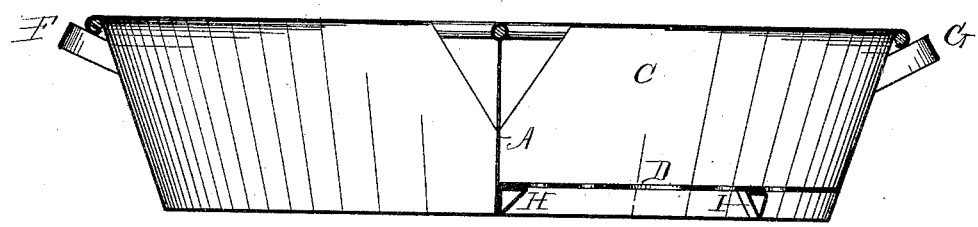

Figure 1 in the drawings represents the dish-pan, drainer, and spout. Fig. 2 represents a mutilated side view, given to show the manner in which the drainer is attached when in position, and the brackets on which the drainer rests.

The pan is divided through the middle into two compartments by a partition. One side is for washing the dishes and the other for draining them.

A indicates the partition separating the compartments.

B indicates the compartment in which the dishes are washed. C is the one in which they are drained. In the drain side C there is a perforated tin drainer raised two and one-half inches from the bottom of the pan. The drainer is detachable, and may be removed at will.

D indicates the drainer in position on small tin brackets H and I, Fig. 2. The pan has a spout, E, which extends from one side of the partition to the other, so that the wash-water and the drain-water can be poured from both compartments through the spout. The pan has two handles, F and G, as shown in both figures.

I am aware that dish-pans have been in use some time; but

What I claim as my invention, and desire to secure by Letters Patent, is—

As a new article of manufacture, the herein-described dish-pan provided with water-compartment B, draining-compartment C, the latter having a perforated bottom, partition A, and spout E, separated into two equal parts by said partition, substantially as described.

EDWARD F. W. ELLIS.

Witnesses:
 IRA PHILLIPS,
 E. H. EDDIE.